United States Patent [19]

Bosnyak et al.

[11] Patent Number: 5,658,653

[45] Date of Patent: Aug. 19, 1997

[54] POLYMERIC COMPOSITES WITH CRYSTALLINE MIXED METAL HYDROXIDE PARTICLES DISPERSED THEREIN

[75] Inventors: Clive P. Bosnyak, Lake Jackson, Tex.; John L. Burba, III, Newtown, Pa.; Malcolm F. Finlayson, Houston, Tex.; Arthur E. Read, Jr., Lake Jackson, Tex.; Chai-Jing Chou, Missouri City, Tex.

[73] Assignee: The Dow Chemical Company, Midland, Mich.

[21] Appl. No.: 344,076

[22] Filed: Nov. 23, 1994

Related U.S. Application Data

[63] Continuation-in-part of Ser. No. 963,843, Oct. 20, 1992, abandoned, which is a continuation-in-part of Ser. No. 568,450, Aug. 15, 1990, abandoned, which is a continuation-in-part of Ser. No. 775,662, Oct. 11, 1991, Pat. No. 5,443,761, which is a continuation-in-part of Ser. No. 526,970, May 16, 1990, Pat. No. 5,094,778, which is a continuation of Ser. No. 282,445, Dec. 9, 1988, abandoned, which is a continuation of Ser. No. 47,800, May 7, 1987, Pat. No. 4,790,954, which is a continuation of Ser. No. 752,326, Jul. 5, 1985, Pat. No. 4,664,843.

[51] Int. Cl.$^6$ ............................. B32B 5/16; B32B 27/20
[52] U.S. Cl. ................ 428/328; 252/315.01; 252/315.2; 252/315.5; 252/609; 252/610; 428/330; 428/333; 524/786
[58] Field of Search ............................. 252/315.01, 315.2, 252/315.5, 609, 610; 428/328, 330, 333, 283; 524/786

[56] References Cited

U.S. PATENT DOCUMENTS

| | | |
|---|---|---|
| 4,076,922 | 2/1978 | Satoh et al. . |
| 4,085,088 | 4/1978 | Miyata et al. . |
| 4,242,396 | 12/1980 | Wilson et al. ............................. 428/141 |
| 4,267,097 | 5/1981 | Michl et al. ............................. 524/786 |
| 4,284,762 | 8/1981 | Miyata et al. . |
| 4,299,759 | 11/1981 | Miyata et al. . |
| 4,351,814 | 9/1982 | Miyata et al. . |
| 4,381,349 | 4/1983 | Lee et al. . |
| 4,392,961 | 7/1983 | Lee et al. . |
| 4,405,727 | 9/1983 | Brownscombe ..................... 428/333 X |
| 4,420,580 | 12/1983 | Herman et al. . |
| 4,446,201 | 5/1984 | Lee et al. . |
| 4,511,710 | 4/1985 | Wang et al. . |
| 4,594,335 | 6/1986 | Burba, III et al. . |
| 4,610,797 | 9/1986 | Kar . |
| 4,611,024 | 9/1986 | Wolfe . |
| 4,629,626 | 12/1986 | Miyata et al. . |
| 4,656,088 | 4/1987 | Tokunaga et al. .................. 428/328 X |
| 4,686,791 | 8/1987 | Miyata . |
| 4,727,167 | 2/1988 | Burba, III et al. . |
| 4,883,533 | 11/1989 | Kosin et al. . |
| 4,889,885 | 12/1989 | Usuki et al. ............................. 524/445 |
| 4,910,246 | 3/1990 | Burba, III et al. ............... 252/315.2 X |
| 4,985,485 | 1/1991 | Bonin et al. . |
| 4,990,268 | 2/1991 | Burba, III et al. . |
| 5,015,409 | 5/1991 | Read, Jr. . |
| 5,084,209 | 1/1992 | Burba, III et al. . |
| 5,094,778 | 3/1992 | Burba, III et al. . |
| 5,102,948 | 4/1992 | Deguchi et al. . |
| 5,120,783 | 6/1992 | Nosu et al. . |
| 5,141,980 | 8/1992 | Ranceze et al. . |
| 5,154,932 | 10/1992 | Burba, III et al. . |
| 5,155,145 | 10/1992 | Foster et al. . |
| 5,169,892 | 12/1992 | Kawashima et al. . |
| 5,196,143 | 3/1993 | Burba, III et al. . |
| 5,214,090 | 5/1993 | Moriyama et al. . |

FOREIGN PATENT DOCUMENTS

| | | |
|---|---|---|
| 0142773 | of 1985 | European Pat. Off. . |
| 0398551 | of 1990 | European Pat. Off. . |
| S48-29479 | of 1973 | Japan . |
| 49-18789 | of 1974 | Japan . |
| WO92/06135 | of 1992 | WIPO . |

OTHER PUBLICATIONS

Brydson, J.A., *Plastics Materials*, 1975, pp. 114–117.

*Primary Examiner*—Richard D. Lovering

[57] ABSTRACT

The invention provides composites of organic polymeric compositions including a matrix of an organic polymer and a filler distributed throughout the matrix, the flier being present in the matrix substantially as separate particles, each about the fundamental particle size of the filler. The fillers are unique mixed metal hydroxide compositions that are obtainable in sub-micron size particles. These particles are layered and have a BET specific surface area in excess of about 100 m$^2$/g. An anion of the particulates is selected to be compatible with the organic polymer thereby providing ease of dispersion of the filler particles throughout the polymer matrix.

22 Claims, 3 Drawing Sheets

POLYMERIC COMPOSITES WITH CRYSTALLINE MIXED METAL HYDROXIDE PARTICLES DISPERSED THEREIN

RELATED APPLICATIONS

This application is a continuation-in-part of U.S. Ser. No. 08/963,843 filed Oct. 20, 1992, and now abandoned, which is a continuation-in-part of U.S. Ser. No. 568,450, filed Aug. 15, 1990, abandoned, which is in turn a continuation-in-part of U.S. Ser. No. 07/775,662, filed Oct. 11, 1991, and now U.S. Pat. No. 5,443,761, which is in turn a continuation-in-part of Ser. No. 526,970, filed May 16, 1990, issued as U.S. Pat. No. 5,094,778, which is a continuation of Ser. No. 282,445, filed Dec. 9, 1988, abandoned, which is a continuation of Ser. No. 47,800, filed May 19, 1987, issued as U.S. Pat. No. 4,790,954, which is a continuation of Ser. No. 752,326, filed Jul. 5, 1985, issued as U.S. Pat. No. 4,664,843.

BACKGROUND OF THE INVENTION

1. Field of the Invention

The invention relates to filled organic polymeric compositions with enhanced toughness and stiffness, improved surface appearance, reduced coefficient of expansion, increased abrasion resistance, improved melt characteristics for processability, improved retention of optical properties, dyeability, and reduction of static charge retention. More particularly, the invention is of composites including an organic polymeric matrix randomly filled with submicron sized particulates having a BET specific surface area greater than about 200 m$^2$/g, a substantial proportion of which particulates are present in the matrix at the fundamental particle size.

2. Description of the Related Art

Various particulate fillers and extenders have been incorporated into polymers for numerous reasons, such as providing or modifying physical properties, chemical properties, visual properties, or cost-effectiveness. Among the polymer properties which can be provided or modified by particulate fillers are opaqueness, density, color, toughness, strength, modulus, fire-retardancy, aesthetic appearance, and polymer morphology such as crystallite formation.

According to Brydson, "Plastics Materials," Third Edition, pp. 114–117 (1975), the term "filler" is usually applied to solid additives incorporated into a polymer to modify its physical (usually mechanical) properties. Particulate fillers are divided into two types: inert fillers and reinforcing fillers. The term "inert filler" is said to be a misnomer because many properties may be affected by incorporation of such a filler. As an example, in a plasticized polyvinyl chloride compound, the addition of an inert filler will reduce die swell on extrusion, increase modulus and hardness, and may provide a white base for coloring, improved electrical insulation properties and reduce tackiness. It is stressed that in each chemical type of filler, a number of grades are available. These grades differ in the following ways: average particle size and size distribution; particle shape and porosity; chemical nature of the surface; and impurities, such as grit and metal ions.

Brydson indicates that the chemical nature of the filler surface has a "vital effect." Mineral fillers often have polar groups, for example, hydroxyl groups, which render them attractive to water but not to organic polymers. To improve the wetting of polymers to fillers, and hence obtain better products, mineral fillers are often pretreated. For example, calcium carbonate may be treated with stearic acid, the acid group attaching itself to the filler particles while the aliphatic chain is compatible with the polymer. Besides improving wetting, such treatment can have a second function: surface hydroxyl groups tend to hydrogen bond to other additives, such as anti-oxidants and some cross-linking components making them ineffective. Preferential absorption by a less expensive additive, such as a glycol, can give much improved results. Coupling agents have been developed, such as certain silanes, which in effect form a polymer shell around the surface of the particle and improve wetting to the main polymer.

Aside from the inert fillers, reinforcing particulate fillers are effective primarily with elastomers although they can cause an increase in tensile strength with plasticized polyvinyl chloride. By mixing carbon black into styrenebutadiene rubber, tensile strength can be increased to over 20 MN/m$^2$ from a strength of about 3 MN/m$^2$. Reinforcement appears to depend upon three factors: an extensity factor (relating to the total amount of surface area of filler per unit volume in contact with the elastomer); an intensity factor (the specific activity of the filler-polymer interface causing chemical and/or physical bonding); and geometrical factors (such as structure or aggregation and porosity of the particles).

Rubbery materials are often incorporated into rigid amorphous thermoplastics to improve their toughness. However, it is not clear whether they should be referred to as "rubbery fillers." Likewise, rubber technologists often incorporate synthetic resins or plastics into the rubbers. Further, fibrous fillers have long been used in plastic materials. These include wood flour, cotton flock, mascerated fabric, short lengths of synthetic organic fibers such as nylon, asbestos, glass fiber, chalked carbon fiber, and the like.

It is an existing problem in the art that for many of the combinations of polymer matrix and crystalline fillers, the fillers were not and could not be dispersed at the primary particle level, i.e., the extensivity factor is below the optimum achievable when maximum use is made of the surface area per unit volume of filler to contact polymer. Thus composite performance attributes could not be maximized. For example, U.S. Pat. No. 4,727,167 teaches that lithium aluminates can be added to polymers, waxes and paraffins which can be sufficiently fluidized to permit adequate mixing. However, it is nowhere stated that these lithium aluminates were dispersed at the primary particle level.

U.S. Pat. Nos. 4,085,088; 4,284,762; 4,299,759; 4,351,814; 4,629,626; and 4,686,791 assigned to Kyowa Chemical Industry Co., Ltd. disclose the use of a hydrotalcites, some having a specific surface area of not more than 30 m$^2$/g, as determined by the BET method. One hydrotalcite is of the general formula

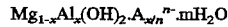

$$Mg_{1-x}Al_x(OH)_2 \cdot A_{x/n}{}^{n-} \cdot mH_2O$$

wherein x is a member of more than 0 but up to 0.5, A$^{n-}$ represents an anion having a valence of n, preferably a divalent anion such as $CO_3^{2-}$ or $SO_4^{2-}$, and m is a positive number. The hydrotalcite preferably has a <003> crystallite size of at least 600 angstroms, especially 100 angstroms. These hydrotalcites are distinguishable from ordinary hydrotalcites that have a BET specific surface area of at least 50 m$^2$/g. The original hydrotalcites have a <003> crystallite size of not more than about 300 angstroms. Also disclosed in the '814 patent are fibrous hydrotalcites having a hexagonal needle-like crystal structure, that is produced by contacting a basic magnesium compound having a needle-like crystal structure, expressed by the formula:

$$Mg(OH)_{2-n'x2}A_{x2}{}^{n'-} \cdot m_2H_2O$$

wherein $A^{n'-}$ represents a monovalent or divalent anion, n' is 1 or 2, and $x_2$ and $m_2$ are numbers satisfying the following conditions:

$$0.2 \leq x_2 \leq 0.5,$$

$$0 \leq m_2 \leq 2,$$

with a compound capable of providing a trivalent metal cation ($M^{3+}$) and being soluble in a liquid reaction medium which is chemically inert and is a non-solvent for the basic magnesium compound. The contacting being carded out in said liquid reaction medium under conditions which do not cause a loss of the needle-like crystal form of the basic magnesium compound, while maintaining the ratio of $M^{3+}$ to the sum of Mg and $M^{3+}$ at $0<M^{3+}/(Mg+M^{3+}) \leq 0.6$ and the pH of the contacting system at not less than 9.

U.S. Pat. Nos. 4,889,885 and 5,102,948 relate to composite materials containing layered silicates. These silicates are anionic fillers and are assertedly uniformly dispersed at high content in a polyamide matrix. In order to produce such a composite, a layered silicate, with a cation exchange capacity of 50 to 200 millieqivalents per hundred grams (meq/100 g) is placed in a swelling condition in a dispersion medium and admixed with a polyamide resin for about 30 minutes or less. This results in a composite in which the layered silicate is uniformly dispersed. When the swellability of the layered silicate and dispersion medium is very good, the layered silicate will apparently be "ultra finely dispersed" in the dispersion media and will not settle out by gravity. The dispersion mediums include water, methanol, ethanol and/or ε caprolacam, among others. The '885 patent utilizes a resin other than polyamide resin and layered silicates with a layer thickness of from about 7 to about 12 angstroms, with an inner layer distance of 30 angstroms or above. It is asserted that the uniform dispersion of the layered silicate in the resin results in superior mechanical characteristics, heat resistance, water resistance, and chemical resistance.

There yet exists a need for a composite with a filler that can be dispersed at the primary particle level in the organic polymeric matrix to permit optimization of extensivity-related composite performance attributes. There yet exists a need for a filled organic polymeric composite that retains toughness and improves stiffness, that has good surface appearance, that has a reduced coefficient of expansion, that has enhanced abrasion resistance, that has flame retardancy, that has improved melt characteristics for processability (such as blow molding), that retains its optical properties, that is dyeable, and that has an improved capability to dissipate static charges.

SUMMARY OF THE INVENTION

The invention provides organic polymeric composites including a matrix of an organic polymer filled with submicron sized particles dispersed therein such that a substantial proportion of the particles are present at the fundamental particle size level, to form an association or mixture with the host polymeric matrix. The polymeric composites of the invention have improved toughness retention and stiffness. They have good surface appearance, being smooth and lacking the roughness sometimes associated with composite materials. The composites have reduced coefficients of expansion, enhanced abrasion resistance, improved flame retardancy, improved melt characteristics for processability (improved lubricity for blow molding) and substantially retain the optical properties of the host matrix. The invention, composites containing a sufficient level of the sub-micron sized fiber, is able to dissipate static electric charges. Further, the composites may be dyed with acid or basic dyes from aqueous or non-aqueous solvents. Thus, the characteristics of the composites make them desirable for the fabrication of, for instance, polymeric fibers that can be used to make a wide range of textiles, including fabrics for a variety of uses, and carpets; housings for appliances, auto body panels, computer housings, and wherever composites generally find use.

In the invention composites, the filler is dispersed in the host matrix so that a substantial proportion of the particles are present at about the fundamental particle size. Further, certain anions of the filler particle are selected so that they will form an association or mixture with the, host polymeric matrix, i.e., in certain resin/filler combinations the filler will react with the polymer to form strong covalent or ionic bonds while in other resin/filler combinations no chemical reaction per se takes place but attractive forces (e.g., van der Waal's forces) exist between resin and flier.

In order to improve compatibility between filler and resin, the filler particle surface may be functionalized or modified so that the surfaces contain moleties that are compatible with and that interact with the resin. For example, the particles may be functionalized with organic acids such as aliphatic acids, salts of sulphonic acids, phosphonic acids, and the like. The anion of the filler particle may also be replaced with groups that hydrogen bond to the resin matrix. In general, a functionality compatible with the resin is selected.

The filler particles may comprise layered mixed metal hydroxide (MMOH) compounds which substantially conform to the following empirical formula:

$$Li_mD_dT(OH)_{(m+2d+3+n \cdot a)}(A^a)_n \cdot xH_2O$$

where m is an mount of Li of from zero to one, where D represents at least one divalent metal cation and d is from about zero to about 4, where T represents at least one trivalent metal cation, where A represents at least one monovalent or polyvalent anion or negative-valence radical, a is an mount of A ions of valence n, with n.a being an amount of from about zero to about −3, where (m+2d+3+n.a) is equal to or more than 3, where m+d is greater than zero, and where $xH_2O$ represents excess waters of hydralion, with x being zero or more. (By "excess waters of hydration," it is meant that there is more water associated with the compound than is needed to supply the amount of hydroxyl ions required in the crystal formula.)

In the above formula, it should be noted that n, being the valence of the anion, is a negative number; thus n.a is a negative number. These mixed metal hydroxide (MMOH) compounds are believed to be of a multilayered variety, containing crystals with a distribution such that some have one layer and others have 2, 3, or more layers per crystal unit. Some of the crystals are, however, of a unique mono-layer unit. The mono-layered crystals are exceedingly small in size having a mono-layered dimension of about 8 to about 16 angstroms in thickness with high aspect ratios generally ranging from about 20 to about 1,000 or more. Aspect ratios in the range of from about .30 to about 650 are readily obtained. The dimensions of multi-layered crystals may be estimated from the mono-layer dimensions and are, in any event, in the sub-micron (less than $10^{-6}$m) particle size range. The BET specific area of the MMOH particles range in excess of 100 m$^2$/g and up to more than 1000 m$^2$/g; preferably about 200 m$^2$/g to about 500 m$^2$/g.

Other useful mixed metal hydroxides are disclosed in U.S. Pat. No. 4,392,961, which is hereby fully incorporated by reference. These mixed metal hydroxides include crystalline magnesium aluminates conforming generally to the empirical formula:

$$MgA^v{}_aZ^v{}_b \cdot nAl(OH)_3 \cdot mH_2O$$

where A and Z represent negative-valence ions or radicals selected from the group comprising hydroxyl, halide, inorganic acid, and organic acid; n is a value of from about 1 to about 2; v is a negative valence of 1, 2, or 3; a and b are each values of from zero to 2; with (va)+(vb) equal to 2, and with m being a value of zero or more.

As explained above, the selection of the anion, A, or a functionality for A, is important for the effective dispersal of the MMOH in the host polymeric matrix. The anion, or functionality grafted to the filler, provides a site which forms a compatible association with the polymeric matrix thereby permitting substantially complete dispersal of the particles in the matrix at about the fundamental particle size.

Depending upon the nature of the composite that is desired, the MMOH fillers may be blended into an organic polymeric melt preferably in an amount ranging from about 0.01 to about 70 wt. %, depending upon the use to which the composite will be put. More preferably, the MMOH filler is added at a rate between about 0.1 wt. % to about 50 wt. %; and most preferably, in the range from about 0.1 wt. % to about 0.1 wt. % to about 30 wt. %.

BRIEF DESCRIPTION OF THE DRAWINGS AND PHOTOMICROGRAPHS

Figure 1:
FIG. 1 is a photomicrograph of lithium aluminate hydroxystearate particles dispersed in a polymer matrix, at 6000 magnification.

FIG. 4 graphically depicts the increase in yellowness, with time of panels coated with mixtures of Example 13. The mixtures of Example 13 are identified as follows:

| MIXTURE NO. | GRAPHIC SYMBOL |
| --- | --- |
| 1 | ■ |
| 2 | □ |
| 3 | ⬥ |
| 4 | ◇ |
| 5 | △ |

DETAILED DESCRIPTION OF THE PREFERRED EMBODIMENT

The invention provides unique organic polymeric composites including an organic polymeric matrix filled with MMOH particles randomly dispersed therein with a substantial proportion of particles being at about the fundamental crystalline particle size, i.e., without significant agglomeration between particles beyond what would be expected to occur by chance. "Random dispersion" does not refer to particle orientation since certain treatments of polymer melt containing MMOH particles may orient the particles, but refers only to spatial distribution of particulates within the polymer matrix.

Typically, the MMOHs are layered crystals that are sub-micron in size. The number of layers per crystal follows a statistical distribution and may range from one (mono-layer) to about 2, 3, or more. The crystals have high aspect ratios ranging from about 20 to about 1000 or more with aspect ratios of 30 to 650 being readily obtained. A single layer crystal has a thickness of less than about 10°Å and lengths ranging from 200°–2000° Å, more especially 500°–1000°Å.

It is important to note that the MMOHs of the present invention have BET specific areas ranging in excess of about 100 m$^2$/g up to more than 1000 m$^2$/g, more especially, the MMOHs have BET specific areas in the range 200–500 m$^2$/g. This is considerably greater than the BET specific areas previously thought to be limiting. For example, U.S. Pat. No. 4,686,791 specifies a BET specific area not greater than 30 m$^2$/g.

According to the invention, MMOH particles are randomly distributed in the polymer matrix so that a substantial proportion of the MMOH particles are spatially separated from each other and are present at the fundamental crystalline particle size, although there may be some agglomeration of particles. The agglomerates consist of clusters of two or more fundamental particles in touching or near touching relationship with respect to each other, and occur randomly.

An excessive amount of agglomerates is undesirable and creates weakened zones in the composite by creating zones for incomplete polymer-particle contact (occlusions etc.) or excessive localized volumes of particles relative to polymer. Further, since the full benefit of particle surface area to volume ratio ("extensivity") is not used, higher particulate loading is needed, often with deleterious effects on other composite properties.

The MMOHs substantially conform to the following generic empirical formula:

$$Li_m D_d T(OH)_{(m+2d+3+n \cdot a)}(A^a)_n \cdot H_2O.$$

where m is an amount of Li of from zero to one,
where D represents at least one divalent metal cation and d is from about zero to about 4,
where T represents at least one trivalent metal cation,
where A represents at least one monovalent or polyvalent anion or negative-valence radical,
a is an mount of A ions of valence n, with n.a being an mount of from about zero to about −3,
where (m+2d+3+n.a) is equal to or more than 3,
where m+d is greater than zero, and
where xH$_2$O represents excess waters of hydration, with x being zero or more. (By "excess waters of hydration" it is meant that there is more water associated with the compound than is needed to supply the amount of hydroxyl ions required in the crystal formula.)

Other useful mixed metal hydroxides are disclosed in U.S. Pat. No. 4,392,961, which is hereby fully incorporated by reference. These mixed metal hydroxides include crystalline magnesium aluminates conforming generally to the empirical formula:

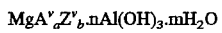

$$MgA^v{}_a Z^v{}_b \cdot nAl(OH)_3 \cdot mH_2O$$

where A and Z represent negative-valence ions or radicals selected from the group comprising hydroxyl, halide, inorganic acid, and organic acid; n is a value of from about 1 to about 2; v is a negative valence of 1, 2, or 3; a and b are each values of from zero to 2; with (va)+(vb) equal to 2, and with m being a value of zero or more.

The selection of the anion, A is important for the effective dispersal of the MMOH in the host polymeric matrix. The anion provides a site which forms an association with the polymeric matrix thereby permitting substantially complete dispersal of the particles in the matrix at about the fundamental particle size.

These particles are desirably added to and mixed with a melt of an organic polymeric composition. The anion A of the MMOH is selected for compatibility with the host polymeric matrix to permit ready dispersal of the MMOH particles, at the primary particle level in the polymeric matrix. Thus, the MMOH may be "derivatized" by adding a functional group or substituting an anion that is compatible with and that forms bonds with both the MMOH particle and the polymer matrix. Thus, for example, MMOHs may be derivatized with organic acids such as aliphatic acids, sulphonic acids, phosphonic acids, and the like that will react or be compatible with the polymer matrix.

Alteratively, the anion of the filler may be selected to hydrogen bond with the polymer. The MMOH may be modified with a compatibilizing solvent so that the resultant MMOH particles are readily dispersible (not agglomerated) and present surfaces that are compatible with the polymer matrix. It is not essential that the MMOH chemically react with the matrix polymer to form covalent or ionic bonds. Other physical phenomena, such as van der Waal's attractive forces may exist between matrix and MMOH particle.

In order to facilitate the dispersion of MMOH in a polymer matrix, at the fundamental crystal particle size, it is preferred that the MMOHs be treated with a compatibilizing solvent, or derivatized with a compatibilizing functionality, or both.

The MMOHs of the invention may be dispersed into nonaqueous (less polar or non-polar) solvents by mixing an MMOH relaxed slurry with a solvent that boils at a temperature greater than water, but which is miscible (or highly soluble) in water and in the target polymer, or a solvent therefor. The mixture of MMOH in solvent is then treated, either by the application of heat, or vacuum, or both, to remove water. The resulting powder is free flowing and dispersible into either water or the target polymeric matrix.

This solvent compatibilizing technique produces free flowing MMOH particles whether or not the MMOH has been derivatized by ion exchange, or other means, with organic anionic materials, such as organic acids (e.g. carboxylic acid, sulfonic acid, phosphoric acid and the like).

It is theorized, without being bound, that when a colloidal dispersion of fine particles, such as MMOH particles in water, is dried, the particles approach each and come into close contact. As more water is removed, the surface tension of the remaining water causes the particles to draw closer to each other until the particles adhere to each other. This adherence or agglomeration of particles is due to close acting forces that extend only a short distance around each particle. In a hydroxy material, such as MMOHs, hydrogen bonds may form between the particles. Because of close stacking, and the relative strength of the bonds, it is then difficult to redisperse the MMOHs into another solvent, or even into water.

It is further theorized that when a compatibilizing solvent is added to the relaxed MMOH slurry, it remains behind in sufficient quantity as water is removed so that final colloidal particles are not brought into close enough contact for close acting forces to develop great strength. Once most of the water is removed, there may be hydrogen bonds formed between the MMOH particles and the solvent. In addition, the presence of solvent reduces surface tension of the water, which somewhat reduces the force with which the particles draw into close contact with each other.

It is theorized, without being bound, that when MMOH has been dried with a compatibilizing solvent, the target solvent enters the compatibilizing solvent and helps to disperse the MMOH particles. Mechanical or sonic mixing, which imparts a high shear to the mixture, facilitates dispersion of the MMOH at substantially the fundamental crystal particle size.

It has been found that there are numerous solvents suitable for use as compatibilizing agents. Some of these include N-methyl-2-pyrrolidinone (NMP) and a range of glycol ethers, including triethylene glycol butyl ether, tripropylene glycol methyl ether (TPM), and the like. Tripropylene glycol methyl ether is particularly preferred. For use in certain applications, such as urethanes, the polyols are suitable compatibilizer solvents. In some instances, the same polyol that forms the urethane can be used as the compatibilizing solvent. Also, certain melamine resins are suitable.

It has been found that the quantity of compatibilizing solvent used to remove water is important. Thus, if TPM is used to dry MMOH, and the weight ratio of TPM to dry MMOH is 1:3, then dispersion is poor as judged by the ability to impart a yield strength to xylene at 3% MMOH. However, if the ratio is 1:1, there is more activity. The best activity is achieved when the ratio is 3:1. Similar ratio effects are seen for other solvents, although the actual ratio may differ, depending upon the solvent used.

In order to produce the invention composites, the organic polymeric composition that will form the matrix is subjected to heat to form a melt. The MMOH particles are then dispersed within the melt. Upon cooling the mixture forms a composite having a polymeric matrix with MMOH particles effectively dispersed therein at the fundamental particle size level.

In general, solvent compatibilizing may be carded out by melt mixing dry MMOH powder in a Banbury mixer or extruder. Vacuum is applied to the extruder and is used to remove air and/or volatiles, such as the solvent. The melt is maintained at about 20° C. above the resin melting point or 100° C. above Tg for an amorphous polymer.

The following examples are intended to illustrate specific embodiments of the invention and are not limiting of the invention as described above and claimed hereafter.

EXAMPLE 1

A Comparative Example Showing a Mismatch of Association and Poor Dispersion of Lithium Aluminum Hydroxystearate (LAS) in a Polymer Matrix About 10 weight % LAS in polyethylene acrylate having an acid content of 9.5% (PRIMACORE 1410 XT manufactured by The Dow Chemical Co.) was extruded using a Weruer-Pfleiderer ZSK 30 mm twin-screw extruder with the temperature set points at 176° C.

The resultant extrudates were examined and showed large particle agglomerations and poor strandibility, apparent to the naked eye.

EXAMPLES 2–5

Good Match of Filler Association and Dispersability

A sample of LAS was dried at 100° C. in a forced-air oven overnight to produce a flee-flowing white powder in separate batches 10, 20, 30, and 50 wt. % of powder was added to pellets of medium density polyethylene (ASPUN 6815A® manufactured by The Dow Chemical Co.) and shaken in a paint-shaker for about 5 minutes. The resultant mixture was extruded using a Werner-Pfleiderer ZSK 30 mm twin-screw extruder with the following temperature set points: feed zone at 180° C. and other four heating zones at 200° C. Extrudate, in the form of strands, were pelletized after passing through a cooling water bath.

The pellets were then molded using an Auberg 80 ton injection molding machine. Before molding, the pellets were dried in a forced air oven at 100° C. for about 4 hours. Injection melt temperatures were about 160° C. and mold pressures at about 35 tons. The pellets were extruded into rectangular bars and standard tensile bars of about ⅛ inch thickness.

The resultant bars, labeled 2–5, were tested for film clarity, elastic modulus, and tensile yield. The results are shown in Table 1 as compared to a control which did not contain LAS.

TABLE 1

| Example | wt. % LAS | Film Clarity | Modulus PSI | Tensile Yield PSI |
|---------|-----------|--------------|-------------|-------------------|
| Control | 0         | clear        | 49,000      | 2060              |
| 2       | 10        | clear        | 85,000      | 2250              |
| 3       | 20        | clear        | 113,000     | 2300              |
| 4       | 30        | clear        | 170,000     | 2320              |
| 5       | 50        | clear        |             |                   |

The addition of LAS did not significantly affect the rarity of the film. However, the ⅛ inch molded bars with show increasing turbidity with increasing levels of LAS.

The photomicrograph, FIG. 1, shows that the LAS is dispersed at the primary particle level.

EXAMPLES 6–7

Good Match of Association and Dispersability of MMOH With Other Polymer Systems Polyethylene (carbon-monoxide) polymer having 10% carbon monoxide content was mixed with LAS to produce composites, in one case containing 10 wt. % LAS and in the other 30 wt. % LAS. In producing these composites, the polymer and LAS was extruded (with temperature set points at feed zone 180° C. and the other 4 heating zones at 200° C.) then injection molded to produce blown films.

It is noteworthy that, although the LAS powder used was not dried, clear films could be produced without difficulty.

EXAMPLES 8 AND 9

Adverse Reaction Between MMOH and Polymer Matrix

Poly(bisphenol A carbonate) of initial molecular weight 23,400, was dried at about 125° C. for about 3 hours.

Lithium aluminum (hydroxide) 7:methacrylic acid (LAMA) was prepared by precipitating lithium aluminum (hydroxide)8 and methacrylic acid from N-methylpyrollidone and then drying the resulting precipitate. LAS was similarly precipitated from N-methylpyrollidone and dried.

Two sets of composites were produced, one containing LAMA and the other LAS in a composite of poly(bisphenol A carbonate), as follows: 50 grams of polymeric pellets and filler powder were hand shaken in glass jars, then added to the mixing chamber of a Haake Rheocord over 3 minutes at 60 RPM at 270° C. The resultant melts were then mixed for 10 minutes at 200 RPM.

Polymeric extrudates were blown into films, the control films having no filler, were tough and tear resistant. The films containing LAS and LAMA were very brittle. The results of these tests are shown in Table 2.

TABLE 2

| % Wt. Additive | PC/MW  | Appearance        |
|----------------|--------|-------------------|
| 0              | 23,000 | Colorless         |
| 5 LAMA         | 6,320  | Yellow and Foamed |
| 5 LAS          | 11,200 | Yellow            |

EXAMPLE 10

Dyeing of MMOH Composites

Polymeric films containing MMOH in a matrix of polyethylene were compression molded at 190° C. to produce films of about 10 mil thickness. These films were placed in a bath of acid dye, acid red 85, dye content 0.1 g dye per 200 ml water.

In the case of one film, the pH of the dye bath was reduced to about 2 using hydrochloric acid. In another, the pH was increased to about 10 with sodium hydroxide. The temperature of the type baths were increased to about 85° C. for about 45 minutes.

After cooling, the films were removed and boiled in water to remove surface bound and/or weakly associated dye particles. The film samples that did not contain LAS exhibited little or no dyeability, whereas the samples containing LAS retained the dyed color. It was observed that the samples dyed at the lower pH dyed to a deeper shade of red than those dyed at the higher pH.

Other samples of polymers films were placed in a vat of basic dye (basic violet 3, dye content 0.5 g per 100 g of water). The temperature of the dye baths were raised to about 85°–90° C. and dying was carried out for about 45 minutes.

After cooling, films were boiled in water to remove surface bound and/or weakly associated dye particles. The samples that did not contain LAS, exhibited little or no dyeability whereas the samples containing LAS retained the dye well.

EXAMPLE 11

Electrostatic Charge Dissipation

Samples of composite containing MMOH in a matrix of polyethylene were compression molded at 190° C. into plaques approximately 75 mil thick. These plaques were cut into strips (3×5 inches) and placed in a dry box at about 10% relative humidity for 24 hours. Static charge dissipation was measured according to Federal Test Standard 101 C, Method 4046. In this test, samples were charged to about 5, 1000 volts and the time (in seconds) to dissipate this charge to less than 100 volts was measured. The results are shown in Table 3.

TABLE 3

| % LAS | +5000 V Charge | −5000 V Charge |
|---|---|---|
| 0 | A | B |
| 10 | >100 sec | >100 sec |
| 20 | >100 sec | >100 sec |
| 30 | >100 sec | 8.5 sec |
| 50 | >100 sec | 10.5 sec |

A: Residual +ve Charge ~5000 V
B: Would not accept −ve charge.

EXAMPLE 12

Dispersion in Acrylonitrile-butadiene-styrene (ABS) and Polypropylene (PP)

Two mixtures were prepared. In the first mixture, 15 g. of a long chain carboxylic acid (UNICID700® made by Petrolite) was combined with 2.1 g. of 50 wt. % strength sodium hydroxide and 100 g. of tripropylene glycol methyl ether (TPM) by stirring with a magnetic bar at 125° C. for 1 hour. A second mixture was prepared by mixing 100 g. of MMOH slurry (9.8 wt. % solid) and 300 g. of deionized water at 75° C. for 15 minutes.

Mixture 1 was then added to mixture 2 and the resultant mixture was stirred at 75° C. for 2.5 hours. Precipitates were filtered from the mixture and washed twice with 500 g. of water. A 10 g. sample of the resulting filter cake was dispersed into a mixture of 400 g. of xylene and 20 g. of TPM, by applying ultrasound. The xylene and residual water in the mixture was then thermally removed in a rotary evaporator, under 3 mm vacuum, at 90° C. for 6 hours.

Samples of the dried, xylene and TPM-treated, MMOH particles were then added to acrylonitrilebutadiene styrene (ABS) and polypropylene (PP). In a first sample, 3% by weight of the modified MMOH was melt blended into ABS using a Haake mixer, maintained at 200° C. and operated at 200 rpm for 10 minutes. Similarly, in the second sample 3 wt. % of the modified MMOH was melt blended into polypropylene.

Figure 2:
FIG. 2 is a photomicrograph of MMOH particles in polypropylene matrix, at 300,000 magnification.
Figure 3:
FIG. 3 is a photomicrograph of MMOH particles in an acrylonitrile-butadiene-styrene matrix, at 300,000 magnification.

The resultant composites are shown in FIGS. 2–3. FIG. 2 shows randomly distributed MMOH particles in a polypropylene matrix, whereas FIG. 3 shows randomly distributed MMOH particles in a ABS matrix.

EXAMPLE 13

Epoxy Resin-Based Paint Containing TPM-Dried MMOH

A sample of MMOH was dried on a double-drum dryer with tripropylene glycol methyl ether (TPM) so that the resulting powder contained 24.3% MMOH.

A sample of this dried, TPM-treated powder was then used to prepare a coating mixture, of the following components:

| Grams | Component |
|---|---|
| 73.99 | Pigment and resin mixture |
| 86.44 | Melamine resin (CYMEL 303 ® manufactured by American Cyanamid) |
| 48.48 | Epoxy resin (Dow 565 ® manufactured by the Dow Chemical Co.) |
| 8.98 | Xylene |
| 12.93 | Butylacetate |

These components were mixed in a tri-pour beaker on a dispermat at 4000 rpm. Seven 50 g. coating mixtures were prepared from this base mixture. Mixture 1 was a control, mixture 2 was a control with TPM added, mixture 3 contained 2 wt. % MMOH, mixture 4 contained 3 wt. % MMOH, mixture 5 contained 5 wt. % MMOH, mixture 6 contained 3 wt. % fumed silica, and mixture 7 contained 3 wt. % fumed silica with TPM. The compositions of the mixtures are set forth in Table 4:

TABLE 4

| Mixture | Base Mixture, g. | Catalyst Solution, g[1] | TMP, g | MMOH g | Silica, g |
|---|---|---|---|---|---|
| 1 | 48.82 | 1.18 | 0.0 | 0.0 | 0.0 |
| 2 | 43.08 | 1.18 | 5.74 | 0.0 | 0.0 |
| 3 | 41.76 | 1.18 | 2.87 | 4.10 | 0.0 |
| 4 | 41.18 | 1.18 | 1.44 | 6.15 | 0.0 |
| 5 | 40.62 | 1.18 | 0.0 | 8.20 | 0.0 |
| 6 | 47.32 | 1.18 | 0.0 | 0.0 | 1.5 |
| 7 | 41.58 | 1.18 | 5.74 | 0.0 | 1.5 |

[1]Catalyst = mixture of 50 g methanol + 40.6 g p-toluene sulfonic acid

The seven mixtures were each individually milled for 15 minutes using a bead mill attachment on the Dispermat, at 1300–1400 rpm. The catalyst solution was added during the last 2–5 minutes of grinding.

Tests samples were prepared by spreading samples of paint on uncoated cold-rolled steel panels using a No. 20 wire wound rod. The panels were allowed to de-gas for 30 minutes, or longer, at ambient conditions and thereafter placed in an oven at 150°–160° C. for at least 30 minutes to cure.

Additional panels were also prepared from each of the samples, except for the silica-containing samples, but these were prepared by coating the panels using a Paul Gardner No. 34 multiple clearance applicator.

Resistance to ultraviolet light exposure was measured by exposing the panels in a QUV Accelerated Weather tester (ASTM D4587-91) and measuring the change in yellowness on a Hunter Labs ColorQUEST instrument (ASTM D2244-89). Also, the yield strength of each sample was measured using vane rheometry on a Brookfield RV TD instrument. Adhesion testing was performed on the panels under ASTM-3359-78.

The results of these tests are shown in the attached Table 5 and FIG. 4.

TABLE 5

| Panel from Mixture | Coating thickness mils | MEK double-rub | Forward/ Reverse | Knoop Hardness | Adhesion | Yield Stress |
|---|---|---|---|---|---|---|
| 1 | 0.924 | 200+ | 25/5 | 23.66 | 2 | 0 |
| 2 | 0.816 | 200+ | 25/5 | 30.26 | 4 | 0 |
| 3 | 0.968 | 200+ | 160/20 | 21.39 | 4 | 265 |
| 4 | 1.164 | 200− | 160/160 | 18.32 | 5 | 619 |
| 5 | 1.92 | 90 | 160/160 | 25.58 | 5 | 406 |
| 6 | 2.353 | 200+ | 20/5 | 25.22 | | 4.7 |
| 7 | 1.116 | 200+ | 20/5 | 22.18 | | 0 |

From this table, the samples containing MMOH showed dramatically increased impact resistance (ASTM, D2794-90) with little reduction in hardness (Knoop Hardness ASTM D1474-85) or chemical resistance (methyl ethyl ketone double rub), except at the 4 wt. % MMOH level. Samples containing MMOH also showed increases in yield stress and improvement in adhesion. From FIG. 4, panels containing MMOH showed increased resistance to yellowing, the resistance increasing with increased level of MMOH concentration.

The invention has been described with reference to its preferred embodiments. A person of ordinary skill in the art, having read the disclosure, will appreciate a variety of changes and modifications which do not depart from the scope and spirit of the invention as disclosed above and claimed below.

The embodiments of the invention in which an exclusive property or privilege is claimed are defined as follows:

1. A composite comprising:
a matrix of an organic polymeric composition; and fine particulates, derivatized to enhance compatibility of surfaces of the particulates with the organic polymeric matrix, having a BET specific area greater than about 100 m²/g dispersed throughout said matrix, a substantial proportion of said particulates being at about the fundamental particle size;
wherein the particulates, before incorporation into the polymer matrix, are selected from group consisting of:
(i) mixed metal hydroxides that substantially correspond to the empirical formula:

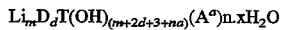

$$Li_m D_d T(OH)_{(m+2d+3+na)}(A^a)n \cdot xH_2O$$

where m represents the number of Li ions present and zero≤m≤1;

D represents divalent metals ions;

d is the number of ions of D in the formula and zero≤d≤4;

T represents at least one trivalent metal-ion;

A represents at least one monovalent or polyvalent anion other than OH ions;

a is the number of ions of A in the formula;

n is the valence of A and −3≤na≤zero; (m+2d+3+na) is equal to or greater than 3 and m+d>zero;

xH₂O represents excess water of hydration and x>0; and (ii) derivatives of the mixed metal hydroxides and organic acids, such derivatives being reactive or compatible with the polymer matrix.

2. The composite of claim 1, wherein the fundamental particulate has a thickness less than about 10°Å and a longest dimension in the size range from about 200° to about 2000°Å.

3. The composite of claim 1, wherein the fine particulates comprise particulates within aspect ratio of from about 20 to about 1000.

4. The composite of claim 1, wherein the polymer matrix is selected from the group consisting of polyolefins, polystyrenes, polyurethanes, epoxy resins, polyimides, polyacetals, polyesters, polyvinyls, polyethers, and polyacrylics.

5. The composite of claim 1 wherein the derivative is a derivative of a mixed metal hydroxide and an organic acid selected from the group consisting of aliphatic acids, sulphonic acids and phosphonic acids.

6. A composite comprising:
a matrix of an organic polymeric composition; and fine particulates having a BET specific area greater than about 100 m²/g dispersed throughout said matrix, a substantial proportion of said particulates being at about the fundamental particle size, and surface moieties of the fine particles react with the polymer matrix to form chemical bonds;
wherein the particulates, before incorporation into the polymer matrix, are selected from group consisting of:
(i) mixed metal hydroxides that substantially correspond to the empirical formula:

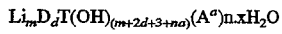

$$Li_m D_d T(OH)_{(m+2d+3+na)}(A^a)n \cdot xH_2O$$

where m represents the number of Li ions present and zero≤m≤1;

D represents divalent metals ions;

d is the number of ions of D in the formula and zero≤d≤4;

T represents at least one trivalent metal ion;

A represents at least one monovalent or polyvalent anion other than OH ions;

a is the number of ions of A in the formula;

n is the valence of A and −3≤na≤zero;

(m+2d+3+na) is equal to or greater than 3 and m+d>zero;

xH₂O represents excess water of hydration and x>0; and (ii) derivatives of the mixed metal hydroxides and organic acids, such derivatives being reactive or compatible with the polymer matrix.

7. The composite of claim 6, whereto the fine particulates have a BET specific area in the range from about 200 to about 1000 m²/g.

8. The composite of claim 6, wherein the rivalent metal ion D is selected from the group consisting of magnesium, calcium and zinc.

9. The composite of claim 8, wherein the anion, A, is selected from anionic portions of compounds selected from the group consisting of carboxylic acids, sulphonic acids and phosphonic acids.

10. A composite comprising:
a matrix of an organic polymeric composition; and
fine particulates, having a BET specific surface area greater than about 100 m²/g, randomly dispersed throughout said matrix, a substantial proportion of said particulates being at about the fundamental particle size;
wherein the particulates, before incorporation into the polymer matrix, are selected from group consisting of:
(i) mixed metal hydroxides that substantially correspond to the empirical formula:

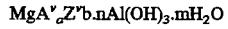

$$MgA^v_a Z^v b \cdot nAl(OH)_3 \cdot mH_2O$$

where A and Z represent negative-valence ions or radicals selected from negative-valence ions or radicals of compounds selected from the group consisting of hydroxyl, inorganic acid, and organic acid; n is a value of from about 1 to about 2; v is a negative valence of 1, 2, or 3; a and b are each values of from zero to 2; with (va)+(Vb) equal to 2, and with m being a value of zero or more; and (ii) derivatives of the mixed metal hydroxides and organic acids, such derivatives being reactive or compatible with the polymer matrix.

11. The composite of claim 10, wherein the fundamental particulate has a thickness of less than about 10°Å and longest dimension in the range from about 200° to about 2000°Å.

12. The composite of claim 10, wherein the: fine particulates comprise particulates within aspect ratio of from about 20 to about 1000.

13. The composite of claim 10, wherein the fine particulates are derivatized to enhance compatibility of surfaces of the particulates with the organic polymeric matrix.

14. The composite of claim 10, wherein surface moieties of the fine particulates react with the polymer matrix to form chemical bonds.

15. The composite of claim 10, wherein the polymer matrix is selected from the group consisting of polyolefins, polystyrenes, polyurethanes, epoxy resins, polyimides, polyacetals, polyesters, polyvinyls, polyethers, and polyacrylics.

16. The composite of claim 10, wherein the fine particulates have a BET specific surface area in the range from about 200 to about 1000 m$^2$/g.

17. The composite of claim 10, wherein the anion A is selected from the group consisting of carboxylic acids, phosphonic acids, and sulphonic acids.

18. A composite comprising:

a matrix of an organic polymeric composition; and fine mixed metal hydroxide particulates of layered platelet structure, having a BET specific surface area greater than about 100 m$^2$/g, dispersed through said matrix and chemically bonded to the polymer matrix, a substantial proportion of said particulates present in the matrix being at a fundamental crystalline particle size thickness of less than about 16 Å.

19. The composite of claim 18 wherein the particulates have a BET specific surface area from about 200 to about 1000 m$^2$/g.

20. The composite of claim 19, wherein the particulates have a fundamental particle size of thickness less than about 10° Å and largest dimension in the range about 200 to about 2000 Å.

21. The composite of claim 20, wherein the fine particulates, at the fundamental particle size, have aspect ratios of from about 20 to about 1000.

22. A composite comprising:

a matrix of an organic polymeric composition; and fine particulates, having a BET specific surface area greater than about 100 m$^2$/g, randomly dispersed throughout said matrix, a substantial proportion of said particulates being at about the fundamental particle size;

wherein the particulates, before incorporation into the polymer matrix, are selected from group consisting of:

(i) mixed metal hydroxides that substantially correspond to the empirical formula:

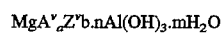

$$MgA^v{}_a Z^v{}_b \cdot nAl(OH)_3 \cdot mH_2O$$

wherein A and Z represent negative-valence ions or radicals selected from the group consisting of the negative-valence ion or radical portion of a halide: n is a value of from about 1 to about 2; v is a negative valence of 1, 2, or 3; a and b are each values of from zero to 2; with (va)+(vb) equal to 2, and with m being a value of zero or more; and (ii) derivatives of the mixed metal hydroxides and organic acids, such derivatives being reactive or compatible with the polymer matrix.

* * * * *